US012759798B2

(12) United States Patent
Bialy et al.

(10) Patent No.: US 12,759,798 B2
(45) Date of Patent: Oct. 13, 2026

(54) CONVEYING DEVICE FOR FOOD PRODUCTS AND ASSOCIATED OPERATING METHOD

(71) Applicant: PROVISUR TECHNOLOGIES, INC., Chicago, IL (US)

(72) Inventors: Jürgen Bialy, Oeschebüttel (DE); Aainani Abdessamad, Bad Gronenbach (DE)

(73) Assignee: Provisur Technologies, LLC, Mokena, IL (US)

( * ) Notice: Subject to any disclaimer, the term of this patent is extended or adjusted under 35 U.S.C. 154(b) by 57 days.

(21) Appl. No.: 18/861,028

(22) PCT Filed: Mar. 23, 2023

(86) PCT No.: PCT/EP2023/057548
§ 371 (c)(1),
(2) Date: Oct. 28, 2024

(87) PCT Pub. No.: WO2023/217450
PCT Pub. Date: Nov. 16, 2023

(65) Prior Publication Data

US 2025/0296780 A1 Sep. 25, 2025

(30) Foreign Application Priority Data

May 10, 2022 (DE) ..................... 10 2022 111 651.4

(51) Int. Cl.
*B65G 15/24* (2006.01)
*B65B 25/06* (2006.01)
(Continued)

(52) U.S. Cl.
CPC .............. *B65G 15/24* (2013.01); *B65B 25/06* (2013.01); *B65B 35/24* (2013.01); *B65B 47/02* (2013.01);
(Continued)

(58) Field of Classification Search
CPC ...... B65G 15/24; B65G 43/08; B65G 47/084; B65G 47/31; B65G 2201/0202;
(Continued)

(56) References Cited

U.S. PATENT DOCUMENTS 4,846,336 A * 7/1989 Hoyland .............. B65G 47/084
198/432
5,123,231 A 6/1992 Fallas et al.
(Continued)

FOREIGN PATENT DOCUMENTS

AU 2005248942 A1 7/2006
DE 619395 A 10/1935
(Continued)

OTHER PUBLICATIONS

International search report issued in connection with PCT application No. PCT/EP2023/057548 and machine translation thereof dated Jul. 3, 2023, 17 pages.

*Primary Examiner* — Mark A Deuble
(74) *Attorney, Agent, or Firm* — Klintworth & Rozenblat LLP

(57) ABSTRACT

A conveying device for conveying food products is provided from a cutting device to a packaging machine. A product format of the food products is provided on the input side which includes a plurality of food products which are arranged in rows parallel to the conveying direction and columns transverse to the conveying direction. The conveying device includes a format-forming conveyor belt, a buffer conveyor belt, an output conveyor belt and a control unit for controlling the belts. The output conveyor belt can be operated bidirectionally to convey the food products in the conveying direction or counter thereto. After a product format has been transferred to the packaging machine, the control unit reverses the output conveyor belt in the direction counter to the conveying direction in order to close a
(Continued)

product gap and so that the next product format can be received. An operating method is also provided.

16 Claims, 5 Drawing Sheets

(51) Int. Cl.

| | |
|---|---|
| ***B65B 35/24*** | (2006.01) |
| ***B65B 47/02*** | (2006.01) |
| ***B65G 43/08*** | (2006.01) |
| ***B65G 47/08*** | (2006.01) |
| ***B65G 47/31*** | (2006.01) |

(52) U.S. Cl.
CPC ........... *B65G 43/08* (2013.01); *B65G 47/084* (2013.01); *B65G 47/31* (2013.01); *B65G 2201/0202* (2013.01); *B65G 2203/0233* (2013.01)

(58) Field of Classification Search
CPC ............ B65G 2203/0233; B65G 43/10; B65B 25/06; B65B 35/24; B65B 47/02
See application file for complete search history.

(56) References Cited

U.S. PATENT DOCUMENTS

| | | | | | |
|---|---|---|---|---|---|
| 5,147,027 | A * | 9/1992 | Cruver | B65G 47/084 | 198/419.3 |
| 5,430,994 | A | 7/1995 | Focke et al. | | |
| 5,499,719 | A * | 3/1996 | Lindee | B07C 5/36 | 209/703 |
| 5,810,149 | A * | 9/1998 | Sandberg | B65G 47/647 | 198/369.2 |
| 6,763,748 | B2 * | 7/2004 | Wolcott | B26D 7/32 | 83/88 |
| 8,612,050 | B2 * | 12/2013 | Lee | B65G 47/31 | 700/226 |
| 9,021,768 | B2 * | 5/2015 | Weber | B65B 57/14 | 198/457.03 |
| 9,221,615 | B2 * | 12/2015 | Bauer | B26D 7/32 | |
| 11,225,347 | B2 * | 1/2022 | Bialy | B65B 35/30 | |
| 11,958,696 | B2 * | 4/2024 | Klein | B65G 47/31 | |
| 2007/0089967 | A1 * | 4/2007 | Pryor | A21C 9/085 | 198/331 |
| 2010/0314218 | A1 | 12/2010 | Silberbauer | | |
| 2017/0339967 | A1 * | 11/2017 | Burk | A22C 17/0073 | |

FOREIGN PATENT DOCUMENTS

| | | | |
|---|---|---|---|
| DE | 4113392 | A1 | 10/1992 |
| DE | 10143506 | A1 | 5/2003 |
| DE | 102010055394 | A1 | 6/2012 |
| DE | 102020207676 | A1 | 12/2021 |
| DE | 102021105093 | A1 | 9/2022 |
| DE | 102021105098 | A1 | 9/2022 |
| DE | 102021105101 | A1 | 9/2022 |
| DE | 102021105103 | A1 | 9/2022 |
| DE | 102021105104 | A1 | 9/2022 |
| DE | 102021105105 | A1 | 9/2022 |
| DE | 102022111651 | B3 | 8/2023 |
| EP | 1165295 | B1 | 10/2002 |
| EP | 2420460 | B1 | 6/2013 |
| EP | 2631204 | A1 | 8/2013 |
| EP | 2878556 | A1 | 6/2015 |
| EP | 3378616 | A2 | 9/2018 |
| EP | 3715287 | A1 | 9/2020 |
| JP | S5854025 | A | 3/1983 |
| JP | H01127515 | A | 5/1989 |
| WO | WO2023217450 | A1 | 11/2023 |

* cited by examiner

CONVEYING DEVICE FOR FOOD PRODUCTS AND ASSOCIATED OPERATING METHOD

TECHNICAL FIELD OF THE INVENTION

The invention concerns a conveying device for conveying food products from a slicing device ("slicer") to a packaging machine (e.g. thermoformer), wherein the packaging machine requires a certain product format of the food products on the input side.

BACKGROUND TO THE INVENTION

Slicing devices, also known as slicers, are known from the state of the art and cut food products into slices. The slices can then be output from the slicing device in the form of stacks of slices to a downstream format-generating conveyor belt, wherein the format-generating conveyor belt sets a desired product format. For example, the stacks of slices can each be arranged in two rows and two columns, such that each product format comprises a total of four stacks of slices.

It is also known from the prior art to transfer such product formats to a packaging machine via a buffer conveyor belt and a further output conveyor belt, wherein this may be a thermoformer (deep drawing machine), for example. It should be mentioned here that the packaging machine expects a certain product format because the packaging machine can, for example, take over a certain number of columns and rows of the stacks of slices at the same time. The product formats are then placed in the packaging machine in packages and sealed by the packaging machine.

A disadvantage of this known state of the art is the fact that four or even more conveyor belts are usually required to provide the desired functions.

With regard to the general technical background of the invention, reference should also be made to DE 101 43 506 A1.

The invention is therefore based on the objective to create a correspondingly improved conveying device. Furthermore, the invention is based on the objective to specify a corresponding operating method for such a conveying device.

DESCRIPTION OF THE INVENTION

The conveying device according to the invention is suitable for conveying food products from a slicing device to a packaging machine. The food products to be conveyed may, for example, be stacks of slices consisting of several slices of cheese, meat or sausage, as is known per se from the prior art. For example, the stacks of slices can also be shingled, such that the slices lying on top of each other do not overlap completely, but only partially. Furthermore, the concept of food products used in the context of the invention also includes other forms of presentation of slices of meat, cheese or sausage.

The packaging machine is preferably a thermoformer (deep drawing machine) as is known from the prior art and therefore does not need to be described in more detail. However, it should be mentioned here that the packaging machine requires a certain product format on the input side. For example, the packaging machine can require on the input side that product formats are delivered that comprise a total of four food products (e.g. stacks of slices), which are arranged in two rows parallel to the conveying direction and two columns transverse to the conveying direction. The conveying device according to the invention then ensures that the product formats required by the packaging machine are delivered to the packaging machine with as gap-less as possible in order to enable trouble-free operation.

The conveying device according to the invention therefore initially comprises, in accordance with the prior art, a format-generating conveyor belt which serves to take over the food products from the slicing device and to generate the product format required by the packaging machine on the format-generating conveyor belt. Alternatively, however, it is also possible for the format-generating conveyor belt not to arrange the product format required by the packaging machine on the format-generating conveyor belt itself, but to take over the food products already in the required product format.

It should also be mentioned that the format-generating conveyor belt does not necessarily take the food products directly from the slicing device. Rather, the format-generating conveyor belt can also take over the food products indirectly from the slicing device, for example via a so-called free-movement system (FMS), which makes it possible to format the food products. Such free-movement systems are known, for example, from DE 10 2021 105 093.6, DE 10 2021 105 098.7, DE 10 2021 105 103.7, DE 10 2021 105 104.5, DE 10 2021 105 101.0 and DE 10 2021 105 105.3, such that the content of these publications should be added to the present description with regard to the design and operation of the free-movement system.

In addition, the conveying device according to the invention comprises a buffer conveyor belt, which is arranged downstream along the conveying direction behind the format-generating conveyor belt and takes over the product formats from the format-generating conveyor belt. The buffer conveyor belt fulfills a buffer function and thus enables asynchronous operation of the format-generating conveyor belt on the one hand respectively the buffer conveyor belt or the format-generating conveyor belt on the other hand.

Furthermore, in accordance with the prior art, the conveying device according to the invention also comprises an output conveyor belt which is arranged downstream along the conveying direction behind the buffer conveyor belt and serves to output the product formats to the packaging machine. In a preferred embodiment of the invention, the output conveyor belt outputs the product formats directly to the packaging machine. However, within the scope of the invention, it is alternatively also possible that one or more further conveyor belts are arranged between the output conveyor belt on the one hand and the packaging machine on the other hand.

Furthermore, in accordance with the prior art, the conveying device according to the invention also comprises a control unit for controlling the format-generating conveyor belt, the buffer conveyor belt and the output conveyor belt.

The conveying device according to the invention is now characterized in that the output conveyor belt can be operated bidirectionally and can convey the food products either in the conveying direction or against the conveying direction.

After the transfer of a product format to the packaging machine, the control unit then drives the output conveyor belt back against the conveying direction in order to close the product gap generated at the beginning of the output conveyor belt by the product transfer to the packaging machine and to then be able to take over a next product format from the buffer conveyor belt without a product gap on the output conveyor belt. To make it easier to understand, it should be mentioned here that the buffer conveyor belt is usually stationary during a product transfer from the output conveyor belt to the downstream packaging machine. As a result, a product transfer by the output conveyor belt causes a product gap to emerge at the beginning of the output conveyor belt. This product gap is closed in the context of the invention by driving back the output conveyor belt after a product transfer. The output conveyor belt can then take over food products from the upstream buffer conveyor belt again without a product gap emerging on the output conveyor belt.

In the preferred embodiment of the invention, the control unit therefore controls the output conveyor belt after the transfer of a product format to the packaging machine such that the output conveyor belt drives back to such an extent that the beginning of the output conveyor belt is again occupied with a product format, so that no product gap emerges on the output conveyor belt when a product format is subsequently taken over from the buffer conveyor belt.

It has already been briefly mentioned above that the buffer conveyor belt fulfills a buffer function. When taking over a product format from the format-generating conveyor belt, the buffer conveyor belt therefore first drives the transferred product format to the middle of the buffer conveyor belt.

It should also be mentioned that the control unit preferably controls the output conveyor belt such that a product format is only transferred from the output conveyor belt to the packaging machine when the output conveyor belt is completely occupied with the product formats transferred on the input side without a product gap. Completing the product loading on the output conveyor belt therefore has priority over transferring the product formats from the output conveyor belt to the packaging machine.

However, it should be mentioned here that the product transfer to the packaging machine preferably has top priority over all other considerations. Such that the packaging machine usually sends a clock-in signal to the control unit of the conveying device according to the invention when a new product format is requested. Upon receipt of such a clock-in signal, the control unit then controls the output conveyor belt such that a product format is output to the packaging machine in response to the product request by the packaging machine. Such clock-in signals are usually generated by the packaging machine with a cycle period of 5-6 seconds, as the packaging machine has a corresponding processing cycle. In the cycle pauses between the clock-in signals, the conveying device according to the invention can then complete the product loading on the output conveyor belt, as described above, wherein the output conveyor belt and the buffer conveyor belt can be driven forwards and backwards.

It has already been mentioned above that the buffer conveyor belt can transfer product formats to the downstream output conveyor belt. Furthermore, it has already been mentioned above that the product formats on the buffer conveyor belt are kept ready in the middle of the buffer conveyor belt with respect to the conveying direction. Before a product transfer from the buffer conveyor belt, the buffer conveyor belt therefore first drives the product format located on the buffer conveyor belt to the end of the buffer conveyor belt. Meanwhile, the output conveyor belt drives back to close a product gap at the beginning of the output conveyor belt. The output conveyor belt and the buffer conveyor belt can then be moved synchronously in the conveying direction to transfer a product format from the buffer conveyor belt to the output conveyor belt. During the product transfer from the buffer conveyor belt to the output conveyor belt, these two conveyor belts can therefore move synchronously.

It should also be mentioned that the format-generating conveyor belt can preferably be operated at a higher feed capacity than the output capacity of the output conveyor belt. The different cycle velocities of the format-generating conveyor belt on the one hand and the output conveyor belt on the other are enabled by the buffer conveyor belt.

In the preferred embodiment of the invention, the output conveyor belt comprises a length along the conveying direction, which is preferably of such size that there is space for several product formats in succession on the output conveyor belt.

The same preferably also applies to the buffer conveyor belt, i.e. the buffer conveyor belt also preferably accommodates several product formats in succession.

The format-generating conveyor belt, on the other hand, can be so short that there is only space for a single product format.

It should also be mentioned that the output conveyor belt preferably has a greater length than the buffer conveyor belt and/or the format-generating conveyor belt. The buffer conveyor belt, on the other hand, is preferably longer than the format-generating conveyor belt.

In general, it should also be mentioned that the various conveyor belts can comprise multiple parallel conveyor tracks, wherein all conveyor tracks are connected to each other and perform the same conveying movement. This is to be distinguished from conveyor belts comprising several conveyor tracks that are operated at different conveyor speeds.

It should also be mentioned that the control unit can detect the product loading on the various conveyor belts and then control the conveyor belts depending on the product loading. The product loading can be detected by product sensors, for example. Alternatively, however, it is also possible for the product loading to be derived by the control unit from the previous control.

With regard to the concept of a product format used in the context of the invention, it should also be mentioned that the product format may comprise the following format properties:

- A predetermined number of food products (e.g. stacks of slices) within the product format.
- A predetermined number of rows parallel to the conveying direction of the product format.
- A predetermined distance between adjacent rows of the product format.
- A predetermined number of columns transverse to the conveying direction within the product format.
- A predetermined distance between the adjacent columns of the product format.
- A predetermined spatial arrangement of the food products (e.g. stacks of slices) relative to each other within the product format.

In addition to the conveying device according to the invention described above, the invention also comprises a corresponding operating method. The individual process steps of the operating method according to the invention are already apparent from the above description of the conveying device according to the invention, such that the individual method steps need not be described separately.

Other advantageous embodiments of the invention are shown in the sub-claims or in the following description of the preferred embodiment of the invention.

DETAILED DESCRIPTION OF THE DRAWINGS

Figure 1:
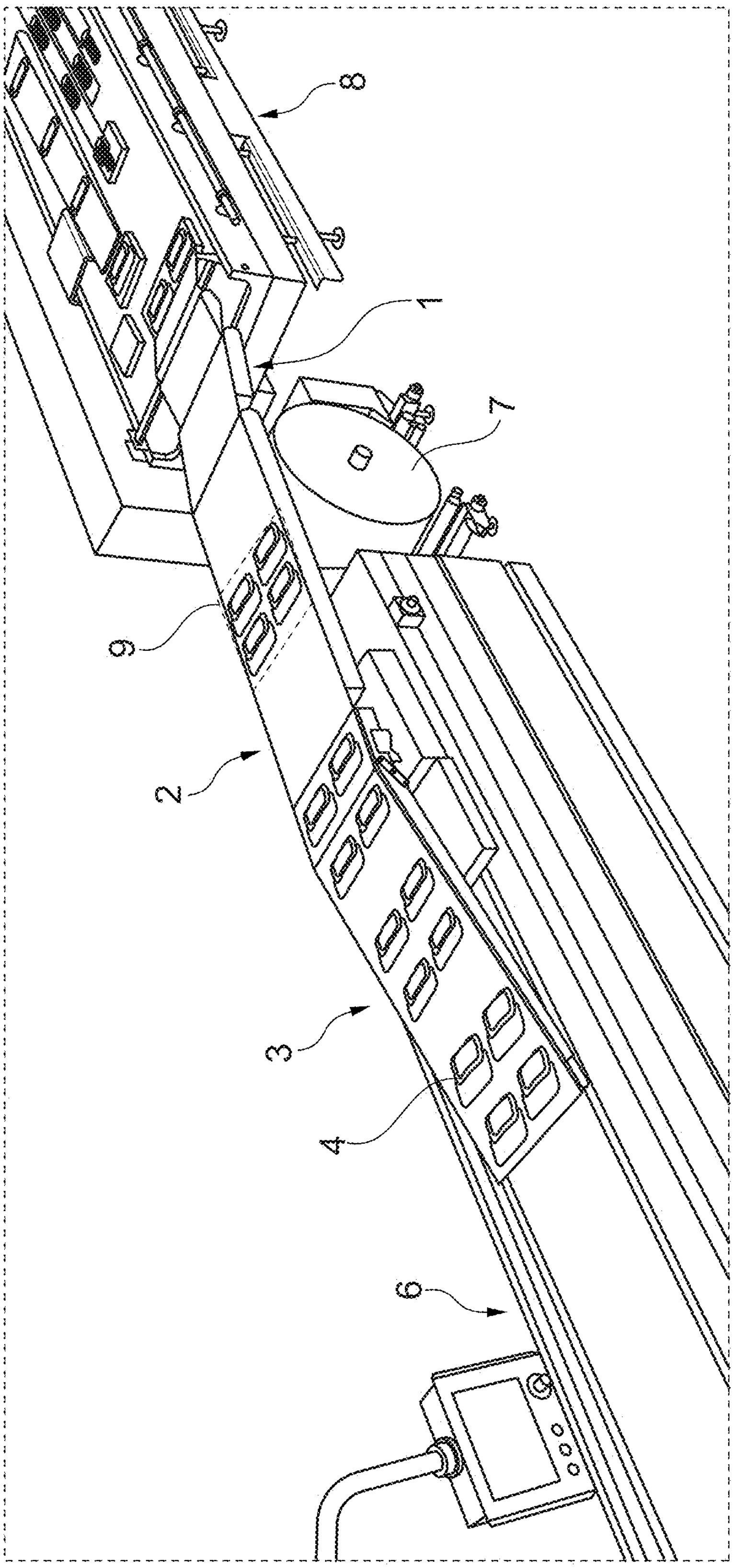
FIG. 1 shows a perspective view of a conveying device according to the invention.

The drawings show a conveying device according to the invention, which essentially comprises a format-generating conveyor belt 1, a buffer conveyor belt 2 and an output conveyor belt 3, which are arranged one behind the other in the conveying direction. In this embodiment example, the format-generating conveyor belt 1, the buffer conveyor belt 2 and the output conveyor belt 3 each comprise two parallel conveyor tracks which are driven together and thus have the same conveying speed.

The conveying device according to the invention is used for conveying food products 4 from a slicing device 5 ("slicer") to a packaging machine 6, wherein in this exemplary embodiment it is a so-called thermoformer, i.e. a deep drawing machine which unrolls a plastic film from a film roll 7 and generates packaging therefrom. The constructional design and functioning of such thermoformers are known from the prior art and therefore need not be described separately.

It can be seen from FIG. 1 that the conveying device according to the invention does not take over the food products 4 directly from the slicing device 5, but from a so-called free-movement system 8 (FMS), which is arranged between the slicing device 5 and the conveying device according to the invention. The structure and mode of operation of the free-movement system 8 is known, for example, from DE 10 2021 105 093.6, DE 10 2021 105 098.7, DE 10 2021 105 103.7, DE 10 2021 105 104.5, DE 10 2021 105 101.0 and DE 10 2021 105 105.3, such that the content of these publications is fully attributable to the present description. At this point, it should only be mentioned that the free-movement system 8 can format the food products 4.

In this exemplary embodiment example, the format-generating conveyor belt 1 takes over complete product formats 9 from the free-movement system 8. The product formats 9 each consist of four food products 4, which are arranged in two columns and two rows. The individual food products 4 can be shingled stacks of slices, as is known from meat processing. The product format 9 is selected such that the product format 9 can be processed by the packaging machine 6.

The format-generating conveyor belt 1 then transfers the product formats 9 received on the input side to the buffer conveyor belt 2, which fulfills a buffer function.

From the buffer conveyor belt 2, the product formats 9 are then output to the output conveyor belt 3, which finally places the product formats 9 into the corresponding packaging in the packaging machine 6.

Figure 2A:
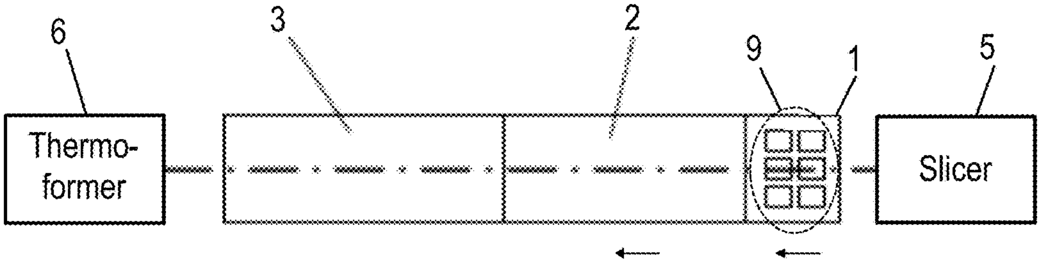
FIGS. 2A-2O show various successive operating phases of the conveying device according to the invention.
Figure 2B:
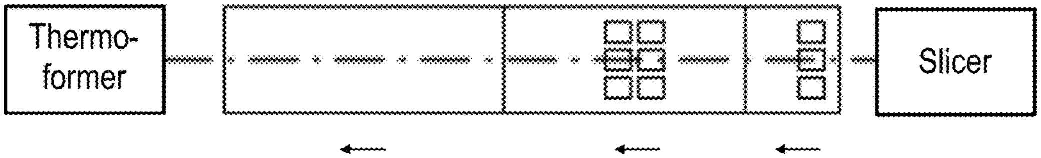
Figure 2C:
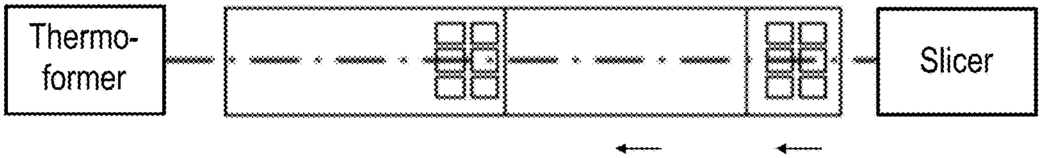
Figure 2D:
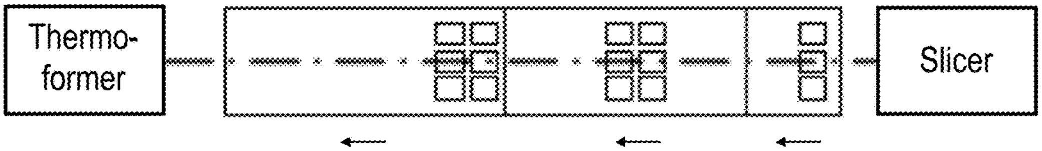
Figure 2E:
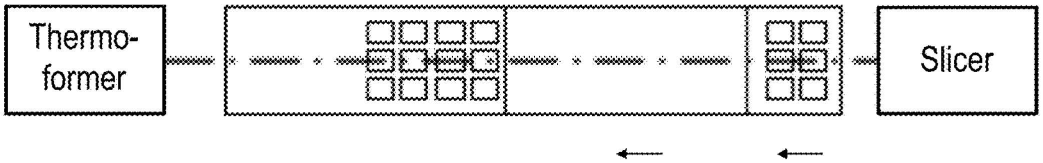
Figure 2F:
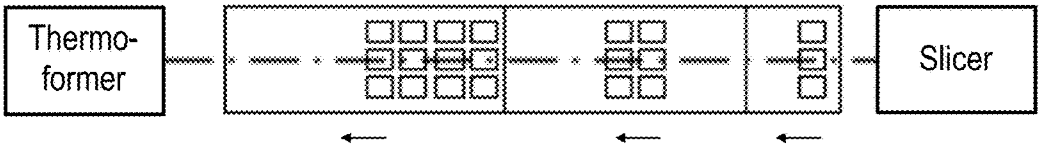
Figure 2G:
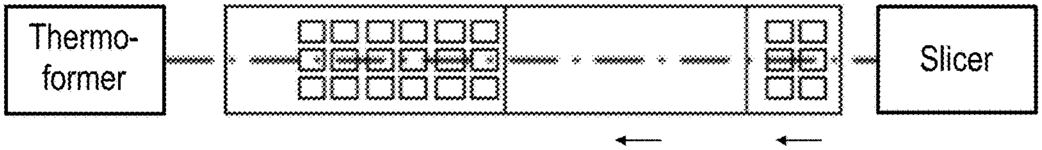
Figure 2H:
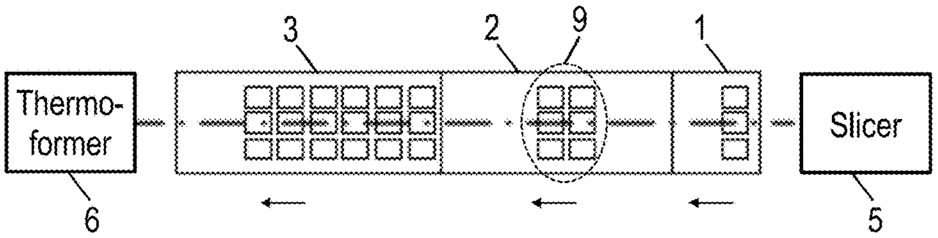
Figure 2I:
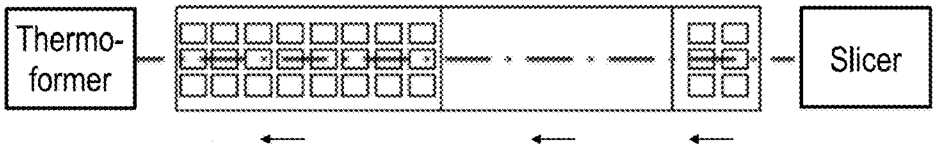
Figure 2J:
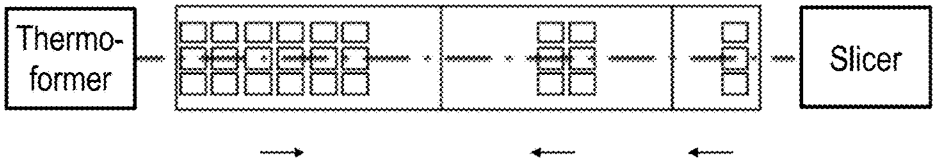
Figure 2K:
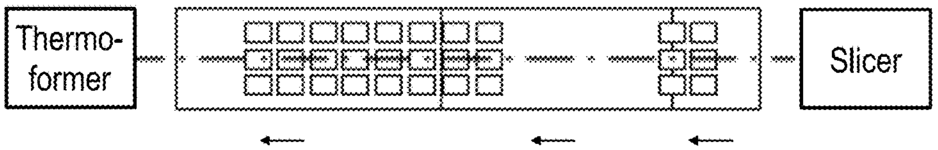
Figure 2L:
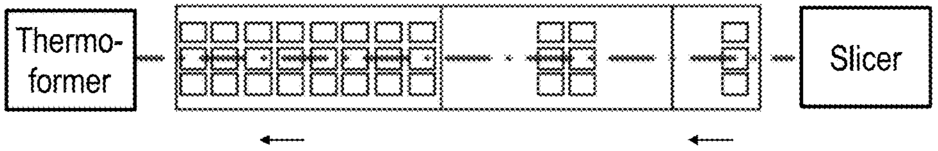
Figure 2M:
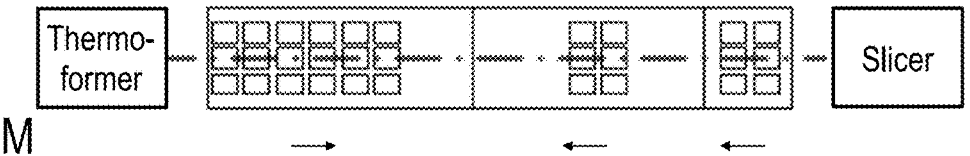
Figure 2N:
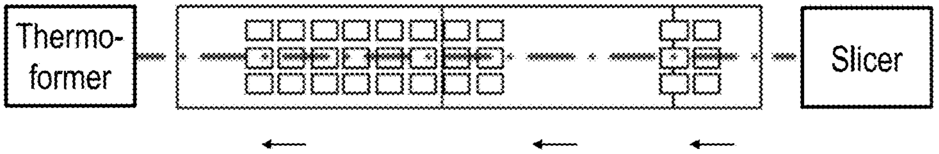
Figure 2O:
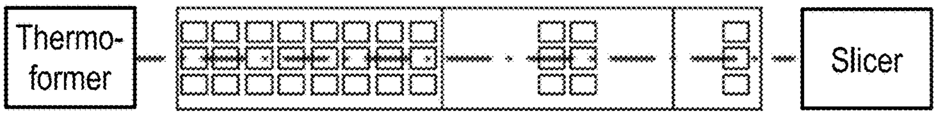
Figure 3:
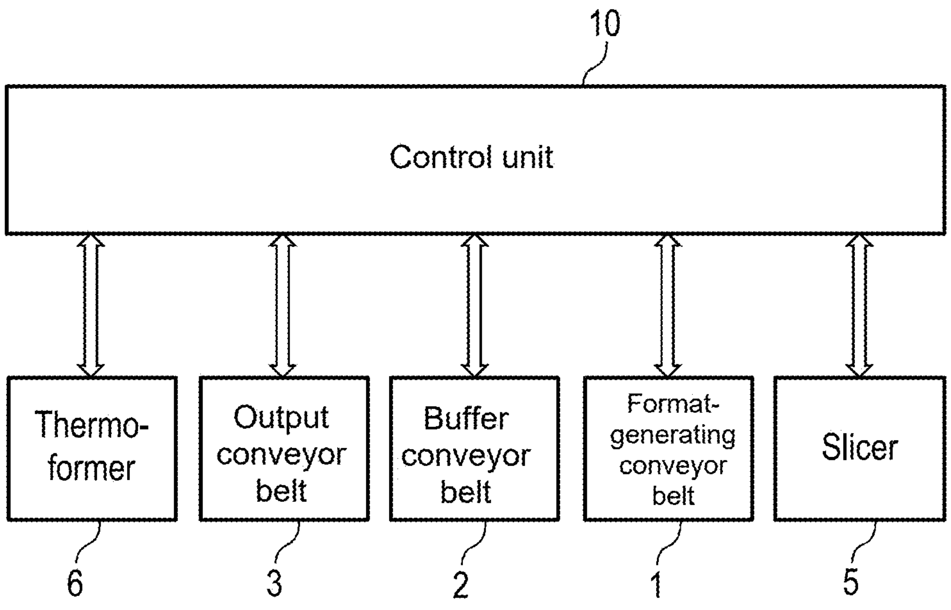
FIG. 3 shows a schematic representation of the conveying device according to the invention.

FIGS. 2A-2O show the various operating phases of the conveying device according to the invention, which are controlled by a control unit 10, wherein the control unit 10 controls the format-generating conveyor belt 1, the buffer conveyor belt 2, the output conveyor belt 3 and is also connected to the slicing device 5 and the packaging machine 6 for coordination.

The various operating phases as shown in FIGS. 2A-2O are described below.

In the operating phase shown in FIG. 2A, the product format 9 was first taken over from the slicing device 5 to the format-generating conveyor belt 1.

In the operating phase according to FIG. 2B, the format-generating conveyor belt 1 has transferred the previously taken over product format 9 to the buffer conveyor belt 2, where it is buffered in the middle of the buffer conveyor belt 2. In addition, the format-generating conveyor belt 1 has already taken over one product row in this operating phase, i.e. half a product format.

In the operating phase shown in FIG. 2C, the buffer conveyor belt 2 has transferred the product format 9 to the output conveyor belt 3, where it is initially held at the beginning of the output conveyor belt 3. In addition, the format-generating conveyor belt 1 has now taken over a complete product format 9 in this operating phase.

In the operating phase shown in FIG. 2D, the format-generating conveyor belt 1 has transferred the previously transferred product format to the buffer conveyor belt 2, where it is held ready in the middle of the buffer conveyor belt 2. In addition, the format-generating conveyor belt 1 has again taken over a product row in this operating phase.

In the operating phase shown in FIG. 2E, the buffer conveyor belt 2 has transferred the previously transferred product format 9 to the output conveyor belt 3, such that the output conveyor belt 3 now carries two product formats at the beginning. In addition, the format-generating conveyor belt 1 has now taken over a complete product format.

In the operating phase shown in FIG. 2F, the format-generating conveyor belt 1 has transferred the previously transferred product format to the buffer conveyor belt 2, where it is buffered in the middle of the buffer conveyor belt 2. In addition, the format-generating conveyor belt 1 has again taken over a product row in this operating phase.

In the operating phase shown in FIG. 2G, the buffer conveyor belt 2 has transferred the previously buffered product format 9 to the output conveyor belt 3, such that the output conveyor belt 3 now carries three complete product formats. In addition, the format-generating conveyor belt 1 has now taken over another product row and now carries a complete product format.

In the operating phase shown in FIG. 2H, the format-generating conveyor belt 1 has transferred the previously held product format to the buffer conveyor belt 2 and at the same time also taken over a product row from the input.

In the operating phase shown in FIG. 2I, the buffer conveyor belt 2 has transferred the previously buffered product format to the output conveyor belt 3, such that the output conveyor belt 3 now carries four complete product formats and is therefore completely occupied. In addition, the format-generating conveyor belt 1 has now taken over another product row and now carries a complete product format.

In the operating phase according to FIG. 2J, the output conveyor belt 3 has output a first product format to the packaging machine 6, such that a product gap has emerged at the beginning of the output conveyor belt 3. In addition, the buffer conveyor belt 2 has taken over a product format from the format-generating conveyor belt 1. Finally, the format-generating conveyor belt 1 has picked up another product row.

In the operating phase according to FIG. 2K, the output conveyor belt 3 is driven back against the conveying direction in order to close the product gap created at the beginning of the output conveyor belt 3. At the same time, the buffer conveyor belt 2 has moved forward in the conveying direction, such that the product format previously buffered in the middle of the buffer conveyor belt 2 lays now at the end of the buffer conveyor belt 2. During this forward movement, a product format has already been partially transferred from the format-generating conveyor belt 1 to the buffer conveyor belt 2.

In the operating phase according to FIG. 2L, the buffer conveyor belt 2 and the output conveyor belt 3 have moved synchronously along the conveying direction, such that the buffer conveyor belt 2 has transferred a complete product format to the output conveyor belt 3. In addition, another product format is now buffered in the middle of the buffer conveyor belt 2. The output conveyor belt 3 is now completely occupied with product formats 9 again.

In the operating phase according to FIG. 2M, the output conveyor belt 3 has again output a product format to the packaging machine 6, as a result of which a product gap has emerged at the beginning of the output conveyor belt 3.

In the operating phase according to FIG. 2N, the output conveyor belt 3 is driven back again in order to close the product gap created at the beginning of the output conveyor belt 3. In addition, the buffer conveyor belt 2 has moved forward, such that a product format is located at the end of the buffer conveyor belt 2.

In the operating phase shown in FIG. 2O, the buffer conveyor belt 2 has moved the output conveyor belt 3 synchronously along the conveying direction in order to transfer the product format from the buffer conveyor belt 2 to the output conveyor belt 3. The output conveyor belt 3 is now completely occupied with product formats 9 again.

Figure 4:
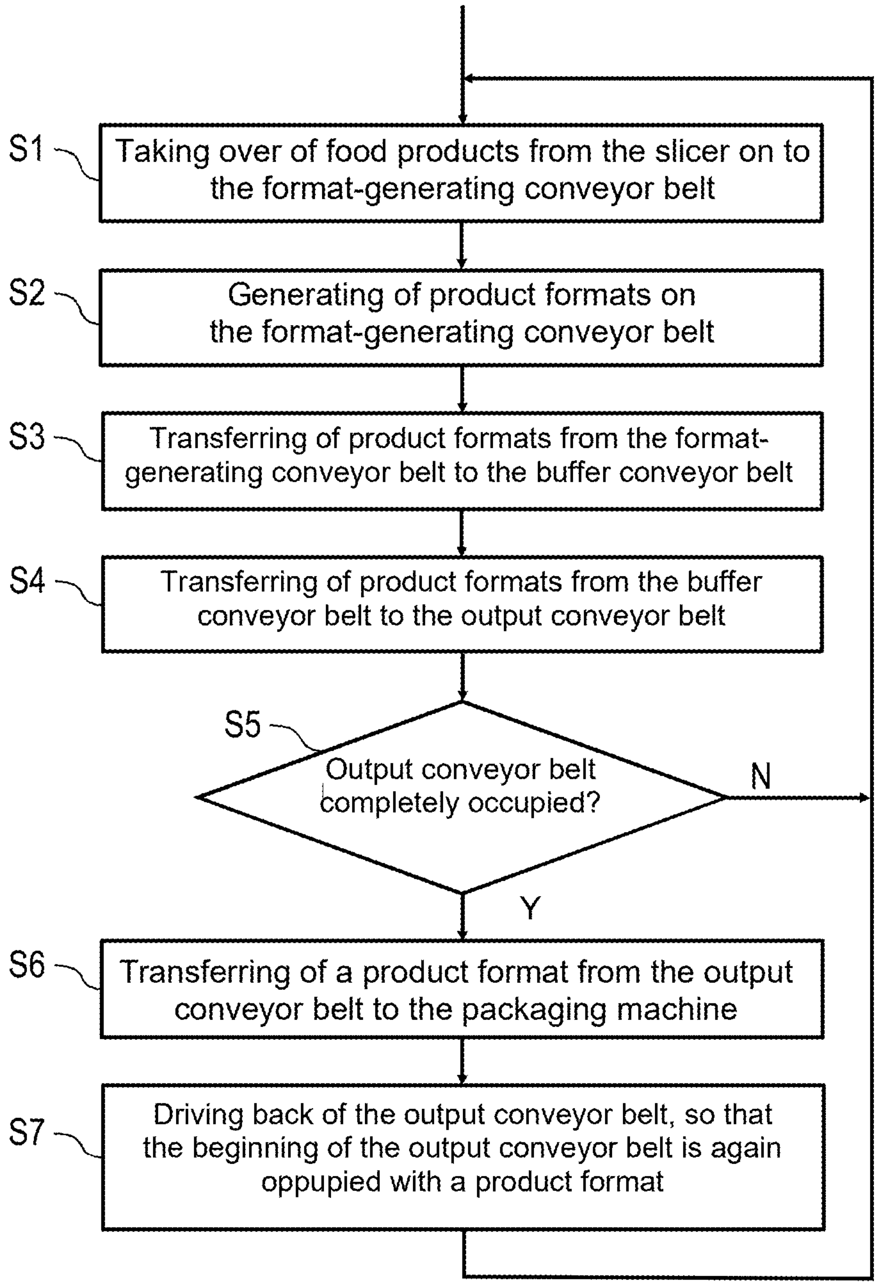
FIG. 4 shows a flowchart illustrating the operating method for the conveying device according to the invention.

The flow chart shown in FIG. 4, which schematically explains the core of the invention, is described below.

In a first step S1, food products are transferred from the slicing device 5 to the format-generating conveyor belt 1

In the next step S2, the desired product formats are then generated on the format-generating conveyor belt 1 and accepted by the packaging machine 6.

In the next step, the product formats are then transferred from the format-generating conveyor belt 1 to the buffer conveyor belt 2.

In a further step S4, the product formats are then transferred from the buffer conveyor belt 2 to the output conveyor belt 3.

The next step S5 then checks whether the output conveyor belt 3 is completely occupied with product formats. If this is not the case, the product loading is completed. However, if the output conveyor belt 3 is already completely occupied with product formats, such that a product format is transferred from the output conveyor belt 3 to the packaging machine 6 in step S6.

Subsequently, in a step S7, the output conveyor belt 3 is driven back in order to close the product gap created at the beginning of the output conveyor belt 3 due to the product transfer to the packaging machine 6.

The invention is not limited to the preferred embodiment example described above. Rather, a large number of variants and modifications are possible which also make use of the inventive concept and therefore fall within the scope of protection. In particular, the invention also claims protection for the subject matter and the features of the subclaims independently of the claims referred to in each case and, in particular, also without the features of the main claim. The invention thus comprises various aspects of the invention which enjoy protection independently of each other.

LIST OF REFERENCE SYMBOLS

1 Format-generating conveyor belt
2 Buffer conveyor belt
3 Output conveyor belt
4 Food products
5 Slicing device (slicer)
6 Packaging machine (thermoformer)
7 Foil roll of the thermoformer
8 Free Movement System (FMS)
9 Product format
10 Control unit

The invention claimed is:

1. A conveying device for conveying food products from a slicing device to a packaging machine which requires a specific product format of the food products on the input side, wherein the product format includes multiple food products which are arranged in rows parallel to the conveying direction and columns transverse to the conveying direction, the conveying device comprising:

a format-generating conveyor belt for taking over the food products from the slicing device and for generating the product format required by the packaging machine on the format-generating conveyor belt or for taking over the food products in the predetermined product format;

a buffer conveyor belt which takes over the product formats from the format-generating conveyor belt and buffers at least one of the product formats, wherein the buffer conveyor belt is arranged downstream along the conveying direction behind the format-generating conveyor belt;

an output conveyor belt for outputting the product formats to the packaging machine, wherein the output conveyor belt is arranged downstream along the conveying direction behind the buffer conveyor belt and the product transfer from the output conveyor belt to the packaging machine generates a product gap at the beginning of the output conveyor belt; and a control unit for controlling the format-generating conveyor belt, the buffer conveyor belt and the output conveyor belt, wherein the output conveyor belt is operable bidirectionally and can convey the food products either in the conveying direction or against the conveying direction, and wherein the control unit drives the output conveyor belt back against the conveying direction after the transfer of a product format to the packaging machine, in order to close the product gap generated at the beginning of the output conveyor belt by the product transfer to the packaging machine and to be able to take over a next product format from the buffer conveyor belt without a product gap on the output conveyor belt.

2. The conveying device according to claim 1, wherein the control unit drives the output conveyor belt back against the conveying direction after the transfer of a product format to the packaging machine to such an extent that the beginning of the output conveyor belt is again occupied with a product format, so that no product gap emerges on the output conveyor belt when a product format is subsequently taken over from the buffer conveyor belt.

3. The conveying device according to claim 1, wherein the control unit controls the buffer conveyor belt when taking over a product format from the format-generating conveyor belt such that the product format taken over is first conveyed to the middle of the buffer conveyor belt.

4. The conveying device according to claim 1, wherein the control unit controls the output conveyor belt such that the output conveyor belt only outputs a product format to the packaging machine when the output conveyor belt is completely occupied with the product formats taken over on the input side without a product gap.

5. The conveying device according to claim 1, wherein the control unit controls the buffer conveyor belt or transferring a product format to the output conveyor belt such that the product format located on the buffer conveyor belt is first conveyed to the end of the buffer conveyor belt so that the output conveyor belt can then take over the product format located on the buffer conveyor belt from the buffer conveyor belt without a product gap on the output conveyor belt.

6. The conveying device according to claim 5, wherein the control unit controls the output conveyor belt and the buffer conveyor belt for transferring a product format from the buffer conveyor belt to the output conveyor belt such that the output conveyor belt and the buffer conveyor belt move synchronously in the conveying direction.

7. The conveying device according to claim 1, wherein the control unit controls the buffer conveyor belt and the output conveyor belt as follows if a product gap has emerged at the beginning of the output conveyor belt after a product transfer from the output conveyor belt to the packaging machine:
- the output conveyor belt is driven back against the conveying direction until the beginning of the output conveyor belt is again occupied with a product format,
- the buffer conveyor belt is driven forward in the conveying direction until the end of the buffer conveyor belt is occupied with a product format,
- the buffer conveyor belt and the output conveyor belt are then driven forward synchronously in the conveying direction in order to transfer the product format located at the end of the buffer conveyor belt from the buffer conveyor belt to the output conveyor belt, such that the output conveyor belt is occupied with the product formats without a product gap.

8. The conveying device according to claim 1, wherein
- the control unit controls the format-generating conveyor belt such that the format-generating conveyor belt takes over the food products from the slicing device with a feed capacity,
- the control unit controls the output conveyor belt such that the output conveyor belt outputs the food products to the packaging machine with an output capacity, and
- the feed capacity is different from the output capacity, in particular greater.

9. The conveying device according to claim 1, wherein
- the control unit receives a clock-in signal from the packaging machine, wherein the clock-in signal indicates that the packaging machine requests a product format,
- the output conveyor belt outputs a product format to the packaging machine upon receipt of the clock-in signal from the packaging machine, and
- the conveying device completes the product loading on the output conveyor belt in the cycle pauses between two successive clock-in signals from the packaging machine.

10. The conveying device according to claim 1, wherein
- the output conveyor belt comprises a length along the conveying direction which is of such size that there is space for several product formats in succession on the output conveyor belt, and/or
- the buffer conveyor belt comprises a length along the conveying direction which is of such size that there is space for several product formats in succession on the buffer conveyor belt, and/or
- the format-generating conveyor belt comprises a length along the conveying direction which is of such size that there is only space for a single product format on the format-generating conveyor belt, and/or
- the output conveyor belt has a greater length along the conveying direction than the buffer conveyor belt, and/or
- that the output conveyor belt has a greater length along the conveying direction than the format-generating conveyor belt, and/or
- the buffer conveyor belt has a greater length along the conveying direction than the format-generating conveyor belt, and/or
- the format-generating conveyor belt comprises multiple parallel conveyor tracks, wherein all conveyor tracks of the format-generating conveyor belt are connected to one another and perform the same conveying movement, and/or
- the buffer conveyor belt comprises multiple parallel conveyor tracks, wherein all the conveyor tracks of the buffer conveyor belt are connected to one another and perform the same conveying movement, and/or
- the output conveyor belt comprises multiple parallel conveyor tracks, wherein all the conveyor tracks of the output conveyor belt are connected to one another and perform the same conveying movement, and/or
- the format-generating conveyor belt, the buffer conveyor belt and the output conveyor belt all have the same number of parallel conveyor tracks, and/or
- the format-generating conveyor belt is configured to take over the product formats indirectly from the slicing device, in particular via a formatting unit which is arranged between the slicing device and the format-generating conveyor belt, and/or
- the control unit is configured to detect the product loading on the format-generating conveyor belt, the buffer conveyor belt and/or the output conveyor belt and, control the format-generating conveyor belt, the buffer conveyor belt and/or the output conveyor belt depending on the product loading, controls the format-generating conveyor belt, the buffer conveyor belt and/or the output conveyor belt, and/or
- the product format required by the packaging machine comprises the following format properties:
  - a predetermined number of food products within the product format,
  - a predetermined number of rows parallel to the conveying direction within the product format,
  - a predetermined distance between the adjacent rows of the product format,
  - a predetermined number of columns transverse to the conveying direction within the product format, and/or
  - a predetermined distance between the neighboring columns of the product format, and/or
  - a predetermined spatial arrangement of the food products relative to one another within the product format, and/or
  - the individual food products are each stacks of slices including several slices of meat, sausage or cheese, and/or
  - the stacks of slices are shingled, such that the stacked slices only partially overlap.

11. An operating method for a conveying device for conveying food products from a slicing device to a packaging machine, in particular to a thermoforming machine, in particular for a conveying device, comprising:

transferring food products from the slicing device to a format-generating belt conveyor and generating a product format on the format-generating belt conveyor;

transferring the product formats on the format-generating belt conveyor to a buffer conveyor belt;

transferring the product formats located on the buffer conveyor belt to an output conveyor belt;

transferring the product formats located on the output conveyor belt to the packaging machine, wherein the product transfer from the output conveyor belt to the packaging machine generates a product gap at the beginning of the output conveyor belt; and driving the output conveyor belt back against the conveying direction after the transfer of a product format to the packaging machine in order to close the product gap generated at the beginning of the output conveyor belt by the product transfer to the packaging machine and to be able take over a next product format from the buffer conveyor belt without a product gap on the output conveyor belt.

12. The operating method according to claim 11, wherein after the transfer of a product format to the packaging machine, the output conveyor belt drives back against the conveying direction to such an extent that the beginning of the output conveyor belt is again occupied with a product format, such that no product gap emerges on the output conveyor belt when a product format is subsequently taken over from the buffer conveyor belt.

13. The operating method according to claim 11, wherein when taking over a product format from the format-generating conveyor belt, the buffer conveyor belt first conveys the product format taken over to the middle of the buffer conveyor belt.

14. The operating method according to claim 11, wherein the output conveyor belt only outputs a product format to the packaging machine when the output conveyor belt is completely occupied with the product formats taken over on the input side without a product gap.

15. The operating method according to claim 11, wherein for transferring a product format from the buffer conveyor belt to the output conveyor belt the product format located on the buffer conveyor belt is first conveyed to the end of the buffer conveyor belt, so that the output conveyor belt can then take over the product format located on the buffer conveyor belt from the buffer conveyor belt without a product gap on the output conveyor belt.

16. The operating method according to claim 11, wherein the buffer conveyor belt and the output conveyor belt are moved as follows when a product gap has emerged at the beginning of the output conveyor belt:

the output conveyor belt is driven back against the conveying direction until the beginning of the output conveyor belt is again occupied with a product format, the buffer conveyor belt is driven forward in the conveying direction until the end of the buffer conveyor belt is occupied with a product format, and the buffer conveyor belt and the output conveyor belt are then driven forward synchronously in the conveying direction in order to transfer the product format located at the end of the buffer conveyor belt from the buffer conveyor belt to the output conveyor belt, such that the output conveyor belt is occupied with the product formats without a product gap.

* * * * *